ns Patented May 11, 1965

3,183,161
AQUEOUS RESUSPENSION VACCINE PRODUCT OF ALUMINUM PHOSPHATE-ADSORBED POLIOMYELITIS VIRUS ANTIGEN, AND PRODUCTION PROCESS
William McLean, Jr., Grosse Pointe, and Frederick W. Trader, Jr., Detroit, Mich., assignors to Parke, Davis & Company, Detroit, Mich., a corporation of Michigan
No Drawing. Filed May 2, 1955, Ser. No. 505,548
16 Claims. (Cl. 167—78)

This invention relates to vaccine products and to a method for preparing the same. More particularly, the invention relates to poliomyelitis vaccine products and to a method for preparing the same.

Poliomyelitis is a virus disease which may be fatal or produce far-reaching crippling effects. Because of the nature of the disease, the only sound approach to the problem lies in prophylaxis, that is, in devising means to prevent the occurrence of the disease. Recently, a killed poliomyelitis vaccine composed of killed but antigenic poliomyelitis viruses of types 1, 2 and 3 has been developed and undergone exhaustive clinical testing. This vaccine although efficacious leaves much to be desired. It is expensive to prepare, the method of preparation precludes standardization or adjustment of the potency, the vaccine produces reactions and discomfort upon administration, the antigenicity of the vaccine falls off quite rapidly on storage, etc.

It is an object of the invention to provide poliomyelitis vaccine products which are more stable on storage than the known poliomyelitis vaccine products.

A further object of the invention is to provide poliomyelitis vaccine products which are capable of producing a much higher antibody response than the known poliomyelitis vaccine products.

A still further object of the invention is to provide poliomyelitis vaccine products which can be standardized.

Another object of the invention is to provide poliomyelitis vaccine products which can be prepared in any desired potency.

Still another object of the invention is to provide poliomyelitis vaccine products of a potency comparable to the known poliomyelitis vaccine products at less cost.

Yet another object of the present invention is to provide poliomyelitis vaccine products which produce less reactions upon administration.

In accordance with the invention these objects and other objects which will appear hereinafter are realized by adsorbing the poliomyelitis virus antigen from a "killed" aqueous poliomyelitis vaccine containing at least one strain of human poliomyelitis antigen onto aluminum phosphate, separating the aluminum phosphate with the adsorbed poliomyelitis antigen from the liquid and resuspending the aluminum phosphate-antigen precipitate in an aqueous medium. By varying the amount of aqueous medium used for resuspending the aluminum phosphate-antigen precipitate one can produce poliomyelitis vaccine products of predetermined potency and aluminum phosphate content. The aluminum phosphate content of the final vaccine product can also be controlled by variation of the amount of aluminum phosphate used for the initial adsorption of the antigen. The poliomyelitis antigen in the products of the invention is much more stable on storage than the antigen present in the original vaccines from which the products have been prepared. Moreover, those products of the invention which contain sufficient aqueous suspending media to bring the volume up to that equal to the original vaccines from which the products have been prepared possess a much higher antigenic potency than the original vaccines and even a much higher antigenic potency than the products obtained by the simple addition of aluminum phosphate to the original vaccines. Surprisingly these particular products of the invention possess an antigenic potency from five to ten times greater than that of the original vaccines and two to three times greater than that of the original vaccines to which aluminum phosphate has been added. These extremely high antigenic potencies of the products of the invention are truly surprising and of great technical significance since by the practice of the invention one can produce from five to ten immunizations from the same quantity of vaccine as is presently used in the preparation of one immunization. Moreover, the five to ten immunizations so produced possess the same antigenic potency as the immunization produced by the known methods. Such products being much more concentrated than the presently used vaccines cause less discomfort on injection and the smaller doses still produce an immunity comparable to that obtained by the use of the vaccines now in use. Perhaps even more surprising is the high antigenic potencies of the products of the invention having the same volume as the original vaccine in comparison to the antigenic potencies of the original vaccines to which aluminum phosphate has been added. Such products would normally be expected to have the same antigenic potency as the original vaccines to which aluminum phosphate has been added. However, as mentioned above, this is not the case although the reason for the great increase in antigenic potency brought about by separating the aluminum phosphate-antigen precipitate from the original vaccine solution and resuspension in an equal volume of aqueous medium is not known. The products of the invention cause little or no reaction on injection. The total protein nitrogen content of the products is very low, usually about 0.0002 to 0.001 mg./ml. in the products having the same volume as the original vaccine, and the aqueous phase of the products of the invention contains substantially no proteins.

The killed aqueous poliomyelitis vaccines used as starting materials in the production of the products of the invention can contain any or all of the various types of human poliomyelitis virus. The preferred vaccines are those which contain a mixture of Types 1, 2 and 3 of poliomyelitis virus antigen. Such vaccines can be produced in a number of different ways. For example, macerated monkey kidney tissue can be trypsinized to remove extraneous tissue, the residual cells allowed to multiply, the medium inoculated with the poliomyelitis virus, the mixture incubated, the fluid harvested and the living virus inactivated by treatment with formaldehyde, ultraviolet radiation or other suitable means. If desired, vaccines prepared by omission of the trypsinization step can also be used but in this instance the protein content of the vaccine may be excessively high and should be assayed before use. In the preparation of mixed vaccines, that is, vaccines containing more than one type of poliomyelitis virus, it is customary to pool or mix the harvested fluids containing the various types subsequent to the inactivation step although, if desired, this can be done preliminarily. When using formaldehyde inactivated vaccines, it is preferable to use vaccines to which no sodium bisulfite has been added to reduce the formaldehyde content.

The aluminum phosphate, the other starting material used in the production of the products of the invention, is employed in the form of a gel. Suitable aluminum phosphate gels can easily be prepared by adding an aqueous solution containing an equivalent amount of a water soluble phosphate such as tribasic sodium phosphate to an aqueous solution containing a known amount of aluminum chloride. The resulting gel is washed to remove inorganic salts, the gel resuspended in water and the pH adjusted to about 5.5 to 6.5. The gel suspension can be sterilized by autoclaving and then the aluminum phosphate content per milliliter determined by drying a small sample. The standardized gel suspension is then stored until one is ready to use it. Just prior to use a measured quantity of the gel suspension is centrifuged to remove the liquid and the residual aluminum phosphate gel used in the production of the products of the invention.

In producing the products of the invention a known quantity of aluminum phosphate gel is suspended in a measured quantity of a killed aqueous poliomyelitis vaccine containing at least one, and preferably three, strains of human poliomyelitis antigen. The suspension can be prepared at any temperature below about 40° C. but it is preferably prepared at a temperature between 0 and 10° C. The resulting suspension is agitated, that is, stirred or shaken, to insure complete adsorption of the antigen, that is, adsorption of 90% or more of the antigen. At room temperature (22 to 25° C.) adsorption of the antigen is complete at the end of about an hour while at lower temperatures the adsorption is somewhat slower. Since extension of the adsorption time to several hours and even several days at low temperatures (0 to 10° C.) does not apparently have any deleterious effect on the antigenicity it is preferable to allow sufficient time to insure complete adsorption of the antigen. In the preparation of the aluminum phosphate-antigen suspensions, the amount of aluminum phosphate is not particularly critical. Of course, sufficient aluminum phosphate gel must be employed to insure complete adsorption of the antigen and so far as it has been possible to determine a minimal quantity of 0.5 mg./ml. of the final suspension is required for this purpose. The upper limit of the aluminum phosphate concentration can be varied widely. Naturally it is preferable not to use such a large quantity that the final product contains an undue amount of aluminum phosphate. In practice the optimal quantity of aluminum phosphate to use for the adsorption of the antigen from the vaccine has been found to be in the range of 0.5 to 25 milligrams per milliliter of vaccine suspension with the preferred range being from 1 to 10 milligrams per milliliter.

After the adsorption of the antigen on the aluminum phosphate gel is complete the aluminum phosphate-antigen precipitate is removed from the suspension. This is preferably done by centrifugation although, of course, other means such as filtration can be used. The isolated aluminum phosphate-antigen precipitate is preferably washed before using it in the preparation of the final products. The washing is carried out by resuspending the precipitate in an aqueous medium, preferably the one to be used in the final product. The volume of the aqueous medium used for washing purposes is not critical but it is customary to use between about one-half to twice the volume of the original vaccine. As aqueous mediums for the washing step and/or the final products one may use water or a physiological salt solution such as physiological saline or Hanks' balanced salt solution. The physiological salt solutions are the preferred aqueous mediums. After thorough mixing the aluminum phosphate-antigen precipitate is separated from the aqueous medium used for washing purposes and resuspended in a predetermined quantity of aqueous medium to obtain the desired final vaccine product. In both the washing and final suspending steps the temperature of the aqueous medium should be kept below about 30° C. and preferably between 0 and 10° C. The quantity of aqueous medium used in the preparation of the final product depends upon the potency and aluminum phosphate content desired. This is, of course, subject to variation within large limits. However, the volume of the aqueous medium should not be so large that it requires more than three milliliters of the product to produce sufficient antibody formation to provide immunization. In other words, each three milliliters of the products should contain at least sufficient antigen to produce immunity. As a practical matter there is no minimal quantity of suspending agent except that the material must be fluid enough to inject. Generally speaking, the preferred products of the invention are those which contain between 0.2 and 8 mg./ml. of aluminum phosphate. To predetermine the amount of suspending agent to use in order to produce a composition having a given aluminum phosphate content involves only a simple calculation. For example, if 4 mg./ml. of aluminum phosphate has been used to precipitate the antigen from the original vaccine and a final product having an aluminum phosphate content of 4 mg./ml. is desired, one employs sufficient of the aqueous suspending medium to give a final volume equal to that of the vaccine employed as the starting material. Such a product contains 4 mg./ml. of aluminum phosphate and has an antigenic potency five to ten times greater than the original vaccine. Similarly, if one wishes to prepare a final product containing 2 mg./ml. of aluminum phosphate then one uses sufficient aqueous suspending medium to give a final volume equal to twice that of the original vaccine, etc.

In order to insure that the products of the invention remain free from contamination by bacteria, molds and fungi it is preferable to incorporate a preservative in the products. The preferred substance for this purpose is benzethonium chloride which can be employed in a concentration of 1 to 10,000 to 1 to 50,000. Other preservatives which do not have a deleterious effect upon the antigenicity of the products can also be used.

If desired, the products of the invention can be combined with other compatible bacterial and viral vaccine products. For example, they may be combined with tetanus-diphtheria-pertussis vaccine products produced by adsorbing the aforementioned antigens on aluminum phosphate, separating the antigen aluminum phosphate precipitate and resuspending in an aqueous medium. These combination products are capable of immunizing against poliomyelitis, tetanus, diphtheria and pertussis. In such combination products, care must be taken to insure that the preservative employed is not one which destroys the antigenicity of the poliomyelitis antigen. Since benzethonium chloride does not adversely affect the poliomyelitis antigen it is the preservative of choice for such products.

The invention is illustrated by the following examples.

EXAMPLE 1

(*a*) *Vaccine preparation*

Cells for the cultivation of poliomyelitis virus are prepared by the method of Dulbecco, Journal of Experimental Medicine, 99, page 167 (1954). Briefly, this procedure consists in first preparing a suspension of monkey kidney epithelial cells [see Dulbecco, Proc. Nat. Acad. Sci., 38, page 747 (1952)] by treating macerated kidney tissue from healthy Cynomalgus or rhesus monkeys with trypsin to remove extraneous matter and release the individual cells. These cells are allowed to multiply on a suitable glass surface in any of a number of tissue culture mediums. The sheet of cultivated kidney cells thus produced is then inoculated with a seed culture of Type 1 (Mahoney strain) poliomyelitis virus and the mixture incubated at 36–37° C. until destruction of the cells is complete and large amounts of new virus have been released. The fluid containing the virus is harvested and passed through an ultra fine fritted glass candle. The filtrate containing the living Type 1 poliomyelitis virus is assayed for virus content, bacterial sterility and strain purity.

A filtrate containing living Type 2 (MEF–1 strain) poliomyelitis virus is prepared by the method described above for the preparation of the filtrate containing Type 1 poliomyelitis virus. A filtrate containing living Type 3 (Saukett strain) poliomyelitis virus is also prepared by the same method.

The living viruses contained in the separate filtrates are inactivated by the addition of formaldehyde and incubation of the resulting separate mixtures in accordance with the procedure set forth in detail in Amendment 2 to the Minimum Requirements of Poliomyelitis Vaccine, published May 20, 1954, by the United States Department of Health, Education and Welfare. No sodium bisulfite is added to neutralize the excess formaldehyde. Approximately equal quantities of the Types 1, 2 and 3 vaccines so produced are pooled and the resulting pooled vaccine used in the preparation of the products of the invention. One aliquot of the pooled vaccine is retained in unaltered form for use as a control sample.

*(b) Preparation of aluminum phosphate suspension*

1485 ml. of a 10% solution of reagent grade aluminum chloride (hexahydrate) in distilled water is added to 7500 ml. of distilled water at 37° C. After thorough mixing, 1485 ml. of a 15.75% solution of reagent grade tribasic sodium phosphate in distilled water is added slowly to the aluminum chloride solution with constant stirring. The mixture is diluted to 12,850 ml. with distilled water at 37° C., the mixture stirred for five minutes and the pH adjusted to 6.4 to 6.6 with 10 N sodium hydroxide solution. The suspension is allowed to stand at room temperature (20–25° C.) for five to seven days. At the end of this time the precipitate has settled to a volume of about 6,250 ml. The supernatant liquid is decanted and discarded. The residual suspension is sterilized by autoclaving for two hours at 121° C. at 15 to 18 lbs. per square inch steam pressure and then allowed to cool. The pH of the sterilized suspension is approximately 5.5 to 5.7. A small sample of the suspension of known volume is removed and evaporated to dryness, the residue weighed and the aluminum phosphate concentration per milliliter calculated. In the particular preparation described the aluminum phosphate content of each milliliter of the suspension was 12 milligrams.

*(c) Preparation of vaccine product*

100 ml. of the aluminum phosphate suspension prepared in (b) above is centrifugated for ten to fifteen minutes at 1,500 r.p.m. The supernatant liquid is discarded. The residual aluminum phosphate gel is resuspended in a sufficient quantity of a pooled poliomyelitis vaccine prepared as described in (a) above to yield a suspension having a volume of 300 ml. The suspension is agitated at about 20° C. for 30 to 60 minutes in order to insure complete adsorption of the antigen. This product contains 4 mg./ml. of aluminum phosphate. 200 ml. of this suspension is retained for use as a control sample.

The remaining 100 ml. of the aluminum phosphate-vaccine suspension is centrifuged for ten minutes at 1,500 r.p.m. The supernatant liquid is removed by decantation and replaced with an equal volume of Hanks' balanced salt solution. [Proc. Soc. Exp. Biol. Med. 71, page 328 (1949).] The mixture is shaken until a uniform suspension is achieved and then the suspension centrifuged for ten minutes at 1,500 r.p.m. The supernatant liquid is removed by decantation and an equal volume of fresh Hanks' balanced salt solution added to the residual gel. The mixture is shaken until a uniform suspension is achieved. The product so produced contains 4 mg./ml. of aluminum phosphate upon which are adsorbed Types 1, 2 and 3 poliomyelitis virus antigen. The liquid phase of this suspension contains substantially no protein. This product is suitable for use as an immunizing agent.

In order to compare the stability and potency of the product of the invention to that of the original pooled poliomyelitis vaccine and also to the original vaccine in which 4 mg./ml. of aluminum phosphate had been incorporated, the three samples were heated at 37° C. for five days. This is equivalent to about five months of storage at a temperature of 4° C. At the end of the heating period the potency of each of the samples was determined by the serum neutralization method described by Salk, Younger and Ward, American Journal of Hygiene, 60, page 214 (1954), and the results expressed in terms of geometric mean titres. Table 1 summarizes the potency data on the three preparations under test.

Briefly the test method involves inoculating rhesus monkeys with three 1 cc. doses of the test vaccine at weekly intervals, bleeding the animals one week after the end of the treatment period, preparing a serum from the collected blood and determining the number of antibodies present in the serum. This determination is made by serially diluting the serum with saline and mixing the diluted aliquots so obtained with a standardized solution containing a known number of infectious units of the given type of poliomyelitis virus. For example, when analyzing for Type 1 potency, one uses a standardized solution containing a known number of infectious units of Type 1 poliomyelitis virus; for analysis of Type 2 or Type 3 potency, one uses a standardized solution of infectious Type 2 or Type 3 virus. The end point of the titration is the dilution at which the serum contains sufficient antibodies to exactly neutralize, that is, combine with and render non-infectious, the known number of infectious units of the virus in the standardized solution. A number of monkeys are used in the analysis of the potency for each type of poliomyelitis virus. The results so obtained are placed in a form for convenient comparison and statistical evaluation by taking the log to the base 2 of the end point dilution for the serum for each monkey, averaging these figures and then taking the antilog of the average so obtained. This antilog is called the geometric mean titre of the vaccines and it, of course, is different for each type of virus present in the vaccine. Since the geometric mean titre is dependent upon the potency of the standardized solution of the infectious poliomyelitis virus used in the test it is necessary to specify the number of infectious units of the poliomyelitis virus present in the standardized solution to reflect the proper significance of the geomertic mean titre. The method of calculating the geometric mean titre is set forth in detail in Amendment Number 2 to the Minimum Requirements of Poliomyelitis Vaccine referred to hereinbefore.

TABLE 1

| Sample Tested [1] | Virus Type | Number of Monkeys Used [3] | No. of Infectious Units of Virus Neutralized [2] | Geometric Mean Titre |
|---|---|---|---|---|
| Original pooled vaccine | 1 | 6 | 32 | 128 |
|  | 2 | 6 | 45 | 256 |
|  | 3 | 6 | 320 | 8 |
| Original pooled vaccine plus 4 mg./ml. aluminum phosphate | 1 | 6 | 32 | 660 |
|  | 2 | 6 | 45 | 540 |
| Antigen adsorbed on aluminum phosphate and suspended in Hanks' solution (AlPO₄ conc., 4 mg./ml.) | 3 | 6 | 320 | 64 |
|  | 1 | 6 | 32 | 1,320 |
|  | 2 | 6 | 45 | 1,740 |
|  | 3 | 6 | 320 | 51 |

[1] All samples heated at 37° C. for five days and stored at 4° C. during inoculation. Monkeys bled one week after last inoculation.
[2] Potency of standardized solution used in tests.
[3] Pre-vaccination titres of all monkeys used was less than 1:4, that is, the monkeys' blood contained no pre-existing poliomyelitis anti-bodies.

As will be seen from the above table the product of the invention produced about ten times more antibody response with respect to Type 1 poliomyelitis virus than the vaccine from which it was produced and twice the antibody response produced by the original vaccine plus aluminum phosphate. With respect to Type 2 poliomyelitis virus, the product of the invention produced about seven times more antibody response than produced by the vaccine from which it was produced and more than three times the antibody response produced by the original vaccine containing aluminum phosphate. With respect to Type 3 poliomyelitis virus the product of the invention produced an antibody response at least six times greater than that produced by the original vaccine from which it was prepared. In fact the antibody response from the original vaccine was so low with respect to Type 3 poliomyelitis virus that statistically speaking the response was insignificant. The Type 3 poliomyelitis virus antibody response for the product of the invention and the original vaccine plus aluminum phosphate was, statistically speaking, about equal. From the above results it is apparent that the potency of the product of the invention is vastly superior not only to the original vaccine from which it was prepared but also to the original vaccine to which aluminum phosphate has been added.

The stability of the product of the invention is shown by the results set forth in Table 2.

TABLE 2

| Sample Tested | Virus Type | Number of Monkeys Used [1] | No. of Infectious Units of Virus Neutralized [2] | Geometric Mean Titre |
|---|---|---|---|---|
| Original pooled vaccine not heated | 1 | 6 | 32 | 810 |
| | 2 | 6 | 45 | 166 |
| | 3 | 6 | 320 | 51 |
| Original pooled vaccine heated at 37° C. for five days | 1 | 6 | 32 | 128 |
| | 2 | 6 | 45 | 256 |
| | 3 | 6 | 320 | 8 |
| Antigen adsorbed on aluminum phosphate and suspended in Hanks' solution (AlPO₄ conc. 4 mg./ml.) heated at 37° C. for five days | 1 | 6 | 32 | 1,320 |
| | 2 | 6 | 45 | 1,740 |
| | 3 | 6 | 320 | 51 |

[1] Pre-vaccination titres of all monkeys used was less than 1:4, that is, the monkeys' blood contained no pre-existing poliomyelitis anti-bodies.
[2] Potency of standardized solution used in tests.

From the above table it will be noted that the original pooled vaccine from which the product of the invention was prepared lost approximately 85% of its potency with respect to Types 1 and 3 poliomyelitis virus antigens during the incubation period which was approximately equivalent to storage for five months at 4° C. On the other hand the product of the invention at the end of the incubation period possessed six to ten times the potency of the incubated original vaccine sample and 1.6 to 10 times the potency of the unheated original vaccine. Thus the product of the invention after incubation was not only far superior to the incubated original vaccine from which it was prepared but also far superior in potency to the original vaccine which had not been subjected to any accelerated aging treatment.

If desired, the product of the invention prepared above can be diluted with an equal volume of cold Hanks' solution to obtain a vaccine product having one-half the potency of the original product and containing 2 mg./ml. of aluminum phosphate. Similarly, by the addition of three volumes of cold Hanks' solution to the product of the invention one obtains a vaccine product having one-fourth the potency of the undiluted product and 1 mg./ml. of aluminum phosphate. Thus by appropriate dilutions of the product of the invention vaccine products of predetermined potency can be produced. Similarly, if products having a higher potency than the above described product are desired they may be produced simply by reducing the volume of cold Hanks' solution used in the preparation of the final suspension of the aluminum phosphate-antigen precipitate. For example, if a product having twice the potency and containing 8 mg./ml. of aluminum phosphate is desired, one simply uses only enough Hanks' solution in preparing the final suspension of the aluminum phosphate-antigen precipitate to bring the volume to 50 ml. instead of 100 ml.

EXAMPLE 2

Approximately 2,700 ml. of a poliomyelitis vaccine containing Types 1, 2 and 3 antigen is prepared as described in Example 1(a). A 100 ml. aliquot of the vaccine is removed and 0.25 ml. of a 1% solution of benezethonium chloride is added slowly with efficient stirring to the cold vaccine. The resulting product which contains benzethonium chloride in a concentration of 1:40,000 is retained for use as a control sample.

800 ml. of the aluminum phosphate suspension (12 mg./ml.) prepared in Example 1(b) is centrifuged for ten to fifteen minutes at 1,500 r.p.m. The supernatant liquid is removed by decantation and discarded. Sufficient cold poliomyelitis vaccine is added with stirring to the residual aluminum phosphate gel to bring the volume to 2,600 ml. The resulting suspension is shaken for sixty hours at 4° C. in order to insure complete adsorption of the antigen. A 100 ml. aliquot of the suspension so obtained is withdrawn and 0.25 ml. of a 1% solution of benzethonium chloride added slowly with stirring to the cold vaccine suspension. The resulting product which contains 4 mg./ml. of aluminum phosphate and benzethonium chloride in a concentration of 1:40,000 is retained for use as a control sample.

The remaining 2,500 ml. of aluminum phosphate-vaccine suspension is divided into two equal portions. One 1,250 ml. portion is centrifuged for ten minutes at 1,500 r.p.m. and the supernatant liquid poured off and discarded. The residue is resuspended in sufficient cold Hanks' balanced salt solution to bring the volume to 1,250 ml. After thorough mixing the suspension is centrifuged for ten minutes at 1,500 r.p.m. and the supernatant liquid poured off and discarded. The residue is resuspended in sufficient cold Hanks' balanced salt solution to bring the volume to about 1,000 ml. and then 3.12 ml. of a 1% solution of benzethonium chloride is added slowly with efficient stirring. The resulting suspension is diluted to a volume of 1,250 ml. with cold Hanks' balanced salt solution to obtain the desired vaccine product. This product contains 4 mg./ml. of aluminum phosphate and benzethonium chloride in a concentration of 1:40,000. The aqueous phase of the product is substantially free from proteins. The product is much more stable and possesses a much higher potency than the vaccine from which it was produced. It is suitable for use in inoculation of humans against poliomyelitis.

The remaining 1,250 ml. of the aluminum phosphate-vaccine suspension is centrifuged for ten minutes at 1,500 r.p.m. and the supernatant fluid poured off and discarded. The residue is resuspended in sufficient cold buffered physiological saline solution to bring the volume to 1,250 ml. After thorough mixing the suspension is centrifuged for ten minutes at 1,500 r.p.m. and the supernatant liquid poured off and discarded. The residue is resuspended in sufficient cold buffered physiological saline solution (phosphate buffer, pH 7.2) to bring the volume to about 1,000 ml. and then 3.12 ml. of a 1% solution of benzethonium chloride is added slowly with efficient stirring. The resulting suspension is diluted to a volume of 1,250 ml. with cold buffered physiological saline solution to obtain the desired vaccine product. This product contains 4 mg./ml. of aluminum phosphate and benzethonium chloride in a concentration of 1:40,000. The aqueous phase of the product is substantially free from proteins. The product is much more stable and possesses a much higher potency than the vaccine from which it was produced. It is suitable for use in inoculation of humans against poliomyelitis.

EXAMPLE 3

Approximately 900 to 1,000 ml. of a poliomyelitis vaccine containing Types 1, 2 and 3 antigen is prepared as described in Example 1(a). A 100 ml. aliquot of the vaccine is removed and 1 ml. of a 1% solution of benzethonium chloride added slowly with stirring to the cold vaccine. The resulting product which contains benzethonium chloride in a concentration of 1:10,000 is retained for use as a control sample. Another 100 ml. sample is withdrawn and treated in a similar manner with 0.5 ml. of a 1% solution of benzethonium chloride. This second control sample contains benzethonium chloride in a concentration of 1:20,000. A third control sample is prepared from a third 100 ml. aliquot of the vaccine by adding 0.25 ml. of a 1% solution of benzethonium chloride. This control sample contains benzethonium chloride in a concentration of 1:40,000.

200 ml. of the aluminum phosphate suspension (12 mg./ml.) prepared in Example 1(b) is centrifuged for ten to fifteen minutes at 1,500 r.p.m. The supernatant liquid is removed and discarded. Sufficient cold poliomyelitis vaccine is added with stirring to the residue to bring the volume to 600 ml. The resulting suspension is shaken for sixty hours at 4° C. to insure complete adsorption of the antigen. A 100 ml. sample of the suspension is removed and 1 ml. of a 1% benzethonium chloride added slowly with stirring to the cold vaccine sample. The resulting product which contains benzethonium chloride in a concentration of 1:10,000 and 4 mg./ml. of aluminum phosphate is retained for use as a control sample. Two further control samples are prepared from 100 ml. aliquots of the vaccine suspension by the addition of 0.5 and 0.25 ml., respectively, of benzethonium chloride solution. These two additional control samples each contain 4 mg./ml. of aluminum phosphate and one contains benzethonium chloride in a concentration of 1:20,000 while the other contains this latter substance in a concentration of 1:40,000.

The remaining 300 ml. of the aluminum phosphate-vaccine suspension is centrifuged for ten minutes at 1,500 r.p.m. The supernatant is poured off as completely as possible and discarded. Cold phosphate buffered physiological saline is added with stirring to the residue until the volume of the suspension reaches 300 ml. After thorough mixing the suspension is centrifuged for ten minutes at 1,500 r.p.m., the supernatant liquid poured off and discarded. Cold phosphate buffered physiological saline solution is added with stirring to the residue until the volume of the suspension reaches 300 ml. The suspension is divided into three 100 ml. aliquots. 1 ml. of 1% benzethonium chloride solution is added slowly with stirring to one of the cold 100 ml. portions of the vaccine suspension to produce a vaccine product containing 4 mg./ml. of aluminum phosphate and benzethonium chloride at a concentration of 1:10,000. In a similar manner, the other two 100 ml. portions of the vaccine suspension are treated with 0.5 ml. and 0.25 ml., respectively, of a 1% benzethonium chloride solution. The two vaccine products so produced each contain 4 mg./ml. of aluminum phosphate but one contains benzethonium chloride in a concentration of 1:20,000 while the other contains this substance in a concentration of 1:40,000. The three vaccine products produced as described above are more stable and possess a much higher potency than the vaccine from which they were produced or the control samples of the vaccine containing a corresponding amount of benzethonium chloride.

What we claim is:

1. A poliomyelitis vaccine product comprising an aqueous suspension of at least one type of killed but antigenic poliomyelitis virus adsorbed on aluminum phosphate, the aqueous phase of said suspension being substantially free from proteins derived from poliomyelitis virus and tissue cultures employed in the propagation thereof.

2. A poliomyelitis vaccine product comprising an aqueous suspension of killed but antigenic Types 1, 2 and 3 poliomyelitis virus adsorbed on aluminum phosphate, said product containing between 0.2 and 8 mg./ml. of aluminum phosphate and the aqueous phase of said suspension being substantially free from proteins derived from poliomyelitis virus and tissue cultures employed in the propagation thereof.

3. A poliomyelitis vaccine product comprising a suspension of killed but antigenic Types 1, 2 and 3 poliomyelitis virus adsorbed on aluminum phosphate in a physiological salt solution, said product containing between 0.2 and 8 mg./ml. of aluminum phosphate and the aqueous phase of said suspension being substantially free from proteins derived from poliomyelitis virus and tissue cultures employed in the propagation thereof.

4. A poliomyelitis vaccine product comprising a suspension of killed but antigenic Types 1, 2 and 3 poliomyelitis virus adsorbed on aluminum phosphate in a physiological salt solution containing benzethonium chloride in a concentration in the range of 1:10,000 and 1:50,000; said product containing between 0.2 and 8 mg./ml. of aluminum phosphate and the aqueous phase of said suspension being substantially free from proteins derived from poliomyelitis virus and tissue cultures employed in the propagation thereof.

5. A poliomyelitis vaccine product comprising a suspension of killed but antigenic Types 1, 2 and 3 poliomyelitis virus adsorbed on aluminum phosphate in physiological saline containing benzethonium chloride in a concentration of 1:40,000; said product containing 4 mg./ml. of aluminum phosphate and the aqueous phase of said suspension being substantially free from proteins derived from poliomyelitis virus and tissue cultures employed in the propagation thereof.

6. A poliomyelitis vaccine product comprising a suspension of killed but antigenic Types 1, 2 and 3 poliomyelitis virus adsorbed on aluminum phosphate in Hanks' balanced salt solution containing benzethonium chloride in a concentration of 1:40,000; said product containing 4 mg./ml. of aluminum phosphate and the aqueous phase of said suspension being substantially free from proteins derived from poliomyelitis virus and tissue cultures employed in the propagation thereof.

7. A poliomyelitis vaccine product comprising a suspension of killed but antigenic Types 1, 2 and 3 poliomyelitis virus adsorbed on aluminum phosphate in physiological saline containing benzethonium chloride in a concentration of 1:20,000; said product containing 4 mg./ml. of aluminum phosphate and the aqueous phase of said suspension being substantially free from proteins derived from poliomyelitis virus and tissue cultures employed in the propagation thereof.

8. A poliomyelitis vaccine product comprising a suspension of killed but antigenic Types 1, 2 and 3 poliomyelitis virus adsorbed on aluminum phosphate in Hanks' balanced salt solution containing benzethonium chloride in a concentration of 1:20,000; said product containing 4 mg./ml. of aluminum phosphate and the aqueous phase of said suspension being substantially free from proteins derived from poliomyelitis virus and tissue cultures employed in the propagation thereof.

9. A poliomyelitis vaccine product comprising a suspension of killed but antigenic Types 1, 2 and 3 poliomyelitis virus adsorbed on aluminum phosphate in physiological saline containing benzethonium chloride in a concentration of 1:10,000; said product containing 4 mg./ml. of aluminum phosphate and the aqueous phase of said suspension being substantially free from proteins derived from poliomyelitis virus and tissue cultures employed in the propagation thereof.

10. Process for producing a poliomyelitis vaccine product which comprises adsorbing the poliomyelitis virus antigen from a killed aqueous poliomyelitis vaccine containing at least one strain of human poliomyelitis antigen onto aluminum phosphate, separating the aluminum phosphate with the adsorbed poliomyelitis antigen from the liquid and resuspending the aluminum phosphate-antigen precipitate in an aqueous medium.

11. Process for producing a poliomyelitis vaccine product which comprises adsorbing the poliomyelitis virus antigen from a skilled aqueous poliomyelitis vaccine containing Types 1, 2 and 3 poliomyelitis antigen onto aluminum phosphate, separating the aluminum phosphate with adsorbed poliomyelitis antigen from the liquid and resuspending the aluminum phosphate-antigen precipitate in an aqueous medium.

12. Process for producing a poliomyelitis vaccine product which comprises adding sufficient aluminum phosphate gel to a killed aqueous poliomyelitis vaccine containing Types 1, 2 and 3 poliomyelitis antigen to produce a suspension containing 0.5 to 25 mg./ml. of aluminum phosphate, agitating the mixture until the adsorption of the antigen onto the aluminum phosphate is complete, separating the aluminum phosphate-antigen precipitate from the solution and resuspending the said precipitate in an aqueous medium.

13. Process for producing a poliomyelitis vaccine product which comprises adding sufficient aluminum phosphate gel to a killed aqueous poliomyelitis vaccine containing Types 1, 2 and 3 poliomyelitis antigen at a temperature below 40° C. to produce a suspension containing 0.5 to 25 mg./ml. of aluminum phosphate, agitating the mixture at a temperature below 40° C. until the adsorption of the antigen is complete, separating the aluminum phosphate-antigen precipitate from the solution, resuspending the said precipitate at a temperature below 30° C. in an aqueous medium of the class consisting of water and physiological salt solutions, removing the aluminum phosphate-antigen precipitate from said aqueous medium and resuspending the precipitate at a temperature below 30° C. in a sufficient quantity of an aqueous medium of the class consisting of water and physiological salt solutions to produce a suspension containing between 0.2 and 8 mg./ml. of aluminum phosphate.

14. Process for producing a poliomyelitis vaccine product which comprises adding sufficient aluminum phosphate gel to a killed aqueous poliomyelitis vaccine containing Types 1, 2 and 3 poliomyelitis antigen at a temperature below 40° C. to produce a suspension containing 1 to 10 mg./ml. of aluminum phosphate, agitating the mixture at a temperature below 40° C. until the adsorption of the antigen is complete, separating the aluminum phosphate-antigen precipitate from the solution, resuspending the said precipitate at a temperature below 30° C. in a physiological salt solution, removing the aluminum phosphate-antigen precipitate from the physiological salt solution and resuspending the precipitate at a temperature below 30° C. in a sufficient quantity of a physiological salt solution to produce a suspension containing between 0.2 and 8 mg./ml. of aluminum phosphate.

15. Process for producing a poliomyelitis vaccine product which comprises adding sufficient aluminum phosphate gel to a killed aqueous poliomyelitis vaccine containing Types 1, 2 and 3 poliomyelitis antigen at a temperature below 40° C. to produce a suspension containing 1 to 10 mg./ml. of aluminum phosphate, agitating the mixture at a temperature below 40° C. until the adsorption of the antigen is complete, separating the aluminum phosphate-antigen precipitate from the solution, resuspending the said precipitate at a temperature below 30° C. in a physiological salt solution, removing the aluminum phosphate-antigen precipitate from the physiological salt solution and resuspending the precipitate at a temperature below 30° C. in a sufficient quantity of a physiological salt solution containing benzethonium chloride in a concentration between 1 to 10,000 and 1 to 50,000 to produce a suspension containing between 0.2 and 8 mg./ml. of aluminum phosphate.

16. A poliomyelitis vaccine product comprising an aqueous suspension of at least one type of killed but antigenic poliomyelitis virus adsorbed on aluminum phosphate, the aqueous phase of said suspension being substantially free from non-viral proteins.

References Cited by the Examiner

UNITED STATES PATENTS

| | | | |
|---|---|---|---|
| 2,012,789 | 8/35 | Kraybill | 167—78 |
| 2,506,345 | 5/50 | Cox | 167—78 |

FOREIGN PATENTS

| | | |
|---|---|---|
| 507,376 | 6/39 | Great Britain. |

OTHER REFERENCES

Freund: Ann. Rev. of Microbiol., 1947, p. 295.

Modern Drug Encyclopedia, 1952, 5th Edition, p. 1140.

Younger: Proc. Soc. Exptl. Biol. and Med., pp. 527–530 (1954).

Chemical Abstracts, vol. 26, 5334 (1932).

Chemical Abstracts, vol. 27, 2203 (1933).

Haas-Deutsche Med. Wchnschr., vol. 80, 273–280 (1955).

Ericsson: Nature, Sept. 7, 1946, vol. 158, pp. 350–351.

Modern Drugs, p. 746, Jan. 1954.

Younger: Proceeding of the Soc. for Exptl. Biol. and Med., pp. 527–530.

Michaels: Mfg. Chem., October 1949, pp. 487–488.

Li et al.: Proc. Soc. Exptl. Biol. and Med., October 1954, pp. 148–157.

LEWIS GOTTS, *Primary Examiner.*

DONALD J. ARNOLD, WILLIAM B. KNIGHT, MORRIS O. WOLK, *Examiners.*